(12) United States Patent
Silvy et al.

(10) Patent No.: US 9,084,990 B2
(45) Date of Patent: Jul. 21, 2015

(54) CATALYST AND METHODS FOR PRODUCING MULTI-WALL CARBON NANOTUBES

(75) Inventors: Ricardo Prada Silvy, Norman, OK (US); Yongqiang Tan, Norman, OK (US)

(73) Assignee: SOUTHWEST NANOTECHNOLOGIES, INC., Norman, OK (US)

( * ) Notice: Subject to any disclaimer, the term of this patent is extended or adjusted under 35 U.S.C. 154(b) by 506 days.

(21) Appl. No.: 13/383,963

(22) PCT Filed: Jul. 16, 2010

(86) PCT No.: PCT/US2010/042321
§ 371 (c)(1),
(2), (4) Date: Feb. 15, 2012

(87) PCT Pub. No.: WO2011/009071
PCT Pub. Date: Jan. 20, 2011

(65) Prior Publication Data
US 2012/0135858 A1  May 31, 2012

Related U.S. Application Data

(60) Provisional application No. 61/226,438, filed on Jul. 17, 2009.

(51) Int. Cl.
*B01J 35/00* (2006.01)
*B01J 23/00* (2006.01)
*B01J 23/75* (2006.01)
*B01J 23/881* (2006.01)
(Continued)

(52) U.S. Cl.
CPC .............. *B01J 35/006* (2013.01); *B01J 23/002* (2013.01); *B01J 23/005* (2013.01); *B01J 23/75* (2013.01); *B01J 23/881* (2013.01); *B01J 23/882* (2013.01); *B01J 35/023* (2013.01); *B01J 37/0009* (2013.01); *B01J 37/031* (2013.01); *B01J 37/04* (2013.01); *B01J 37/08* (2013.01); *B82Y 30/00* (2013.01); *B82Y 40/00* (2013.01); *C01B 31/0233* (2013.01); *B01J 21/04* (2013.01); *B01J 21/10* (2013.01); *B01J 2523/00* (2013.01); *C01B 2202/04* (2013.01); *C01B 2202/06* (2013.01); *C01B 2202/36* (2013.01)

(58) Field of Classification Search
None
See application file for complete search history.

(56) References Cited

U.S. PATENT DOCUMENTS 2,496,660 A   2/1950  Denton et al.
3,867,282 A   2/1975  Fischer et al.
(Continued)

OTHER PUBLICATIONS

Carbon nanotubes in novel ceramic matrix nanocomposites. Flahaut et al. (Ceramics International 26 (2000) 677-683.*

*Primary Examiner* — Melvin C Mayes
*Assistant Examiner* — Colette Nguyen
(74) *Attorney, Agent, or Firm* — McAfee & Taft

(57) ABSTRACT

The present invention provides a catalyst precursor and a catalyst suitable for preparing multi-wall carbon nanotubes. The resulting multi-wall carbon nanotubes have a narrow distribution as to the number of walls forming the tubes and a narrow distribution in the range of diameters for the tubes. Additionally, the present invention provides methods for producing multi-wall carbon nanotubes having narrow distributions in the number of walls and diameters. Further, the present invention provides a composition of spent catalyst carrying multi-wall nanotubes having narrow distribution ranges of walls and diameters.

5 Claims, 14 Drawing Sheets

| Run | WT% | | | | Co salt | Carbon content | Carbon Yield (%) | Median CNT diameter (nm) | Mode diameter (nm) | <10 nm |
| --- | --- | --- | --- | --- | --- | --- | --- | --- | --- | --- |
| | Co | Fe | Mo | Mg | | | | | | |
| PXE2-282 | 1.00 | 1.88 | 0.50 | 0.50 | Co-Ac | 49.6 | 100 | 8.24 | 6.00 | 72.9% |
| PXE2-283 | 1.00 | 1.00 | 0.50 | 0.50 | Co-Ac | 49.8 | 100 | 7.79 | 6.17 | 73.1% |
| PXE2-284 | 1.00 | 0.75 | 0.00 | 0.50 | Co-Ac | 49.2 | 97 | 9.63 | 11.06 | 54.0% |
| PXE2-285 | 1.00 | 0.75 | 0.50 | 0.50 | Co-Nt | 42.8 | 75 | 6.72 | 5.38 | 84.9% |
| PXE2-286 | 1.00 | 0.50 | 0.50 | 0.50 | Co-Nt | 43.8 | 78 | 7.35 | 5.19 | 61.6% |
| PXE2-288 | 1.00 | 0.00 | 1.00 | 0.50 | Co-Nt | 30.1 | 43 | 6.98 | 4.68 | 83.6% |
| PXE2-289 | 1.00 | 1.88 | 0.50 | 0.50 | Co-Nt | 45.2 | 82 | 7.91 | 5.71 | 69.4% |
| PXE2-291 | 0.50 | 1.88 | 0.50 | 0.50 | Co-Nt | 43.3 | 75 | 9.01 | 10.14 | 58.7% |
| PXE2-292 | 0.75 | 1.42 | 0.50 | 0.50 | Co-Ac | 44.2 | 79 | 7.58 | 4.97 | 78.1% |
| PXE2-293 | 0.75 | 1.42 | 0.40 | 0.50 | Co-Ac | 42.1 | 72 | 7.72 | 6.62 | 77.0% |
| PXE2-295 | 1.00 | 1.88 | 0.00 | 0.00 | Co-Ac | 39.2 | 76 | 7.81 | 8.25 | 78.9% |
| PXE2-296 | 0.67 | 1.88 | 0.50 | 0.50 | Co-Ac | 35.6 | 56 | 10.03 | 6.62 | 50.0% |

(51) Int. Cl.
  *B01J 23/882* (2006.01)
  *B01J 35/02* (2006.01)
  *B01J 37/00* (2006.01)
  *B01J 37/03* (2006.01)
  *B01J 37/04* (2006.01)
  *B01J 37/08* (2006.01)
  *B82Y 30/00* (2011.01)
  *B82Y 40/00* (2011.01)
  *C01B 31/02* (2006.01)
  *B01J 21/04* (2006.01)
  *B01J 21/10* (2006.01)

(56) References Cited

U.S. PATENT DOCUMENTS

| | | | |
|---|---|---|---|
| 7,250,148 B2 * | 7/2007 | Yang et al. | 423/447.3 |
| 7,304,012 B2 | 12/2007 | Green et al. | |
| 2003/0091496 A1 | 5/2003 | Resasco et al. | |
| 2005/0002851 A1 | 1/2005 | McElrath et al. | |
| 2006/0024227 A1 | 2/2006 | Maruyama et al. | |
| 2008/0206125 A1 * | 8/2008 | Silvy et al. | 423/445 B |
| 2010/0113259 A1 * | 5/2010 | Ma et al. | 502/183 |

* cited by examiner

| Run | WT% | | | | Co salt | Carbon content | Carbon Yield (%) | Median CNT diameter (nm) | Mode diameter (nm) | < 10 nm |
| --- | --- | --- | --- | --- | --- | --- | --- | --- | --- | --- |
| | Co | Fe | Mo | Mg | | | | | | |
| PXE2-282 | 1.00 | 1.88 | 0.50 | 0.50 | Co-Ac | 49.6 | 100 | 8.24 | 6.00 | 72.9% |
| PXE2-283 | 1.00 | 1.00 | 0.50 | 0.50 | Co-Ac | 49.8 | 100 | 7.79 | 6.17 | 73.1% |
| PXE2-284 | 1.00 | 0.75 | 0.00 | 0.50 | Co-Ac | 49.2 | 97 | 9.63 | 11.06 | 54.0% |
| PXE2-285 | 1.00 | 0.75 | 0.50 | 0.50 | Co-Nt | 42.8 | 75 | 6.72 | 5.38 | 84.9% |
| PXE2-286 | 1.00 | 0.50 | 0.50 | 0.50 | Co-Nt | 43.8 | 78 | 7.35 | 5.19 | 61.6% |
| PXE2-288 | 1.00 | 0.00 | 1.00 | 0.50 | Co-Nt | 30.1 | 43 | 6.98 | 4.68 | 83.6% |
| PXE2-289 | 1.00 | 1.88 | 0.50 | 0.50 | Co-Nt | 45.2 | 82 | 7.91 | 5.71 | 69.4% |
| PXE2-291 | 0.50 | 1.88 | 0.50 | 0.50 | Co-Ac | 43.3 | 75 | 9.01 | 10.14 | 58.7% |
| PXE2-292 | 0.75 | 1.42 | 0.50 | 0.50 | Co-Ac | 44.2 | 79 | 7.58 | 4.97 | 78.1% |
| PXE2-293 | 0.75 | 1.42 | 0.40 | 0.50 | Co-Ac | 42.1 | 72 | 7.72 | 6.62 | 77.0% |
| PXE2-295 | 1.00 | 1.88 | 0.00 | 0.00 | Co-Ac | 39.2 | 76 | 7.81 | 8.25 | 78.9% |
| PXE2-296 | 0.67 | 1.88 | 0.50 | 0.50 | Co-Ac | 35.6 | 56 | 10.03 | 6.62 | 50.0% |

FIGURE 1

| Run | WT % | | | | T(C) | % C2H4 | Carbon content | Carbon Yield (%) | Median CNT diameter (nm) | Mode diameter (nm) | < 10 nm |
|---|---|---|---|---|---|---|---|---|---|---|---|
| | Co | Fe | Mo | Mg | | | | | | | |
| E2-282 | 1.00 | 1.88 | 0.50 | 0.50 | 610 | 40 | 50 | 100 | 8.24 | 6.00 | 73% |
| E2-297 | 1.00 | 1.88 | 0.50 | 0.50 | 650 | 30 | 39 | 64 | 12.09 | 12.88 | 35% |
| E2-298 | 1.00 | 1.88 | 0.50 | 0.50 | 675 | 30 | 38 | 61 | 13.78 | 15.94 | 22% |
| E2-285 | 1.00 | 0.75 | 0.50 | 0.50 | 610 | 40 | 43 | 75 | 6.72 | 5.38 | 85% |
| E2-301 | 1.00 | 0.75 | 0.50 | 0.50 | 675 | 30 | 34 | 52 | 9.80 | 11.45 | 53% |

FIGURE 3 ated (MgAl$_2$O$_4$) as a catalyst support. The catalyst precursor further comprises metallic oxides of cobalt, iron and molybdenum. The preferred metallic oxides include, but are not necessarily limited to, one or more of the following mixed metal oxides: CoFe$_2$O$_4$, CoMoO$_4$, Co$_x$MoO$_4$, Fe$_2$(MoO$_4$)$_3$, Co$_x$Fe$_y$MoO$_4$; where x and y represent the atomic ratios of Co and Fe relative to Mo and x is from about 1.6 to about 6.5 and y is from about 0.1 to about 10.5. Mixed metal oxides having two or more metal components are preferred, as single metal oxides produce carbon fibers and other forms of carbon.

In another embodiment, the present invention provides a method for preparing a catalyst precursor and a catalyst. The method involves initially preparing a solution of mixed metallic compounds comprising two or more of the following: a cobalt compound selected from the group consisting of cobalt acetate, cobalt nitrate; an iron compound selected from the group consisting of iron acetate, iron nitrate; a molybdenum compound selected from the group consisting of ammonium heptamolybdate and ammonium dimolybdate; and magnesium nitrate. This solution is reacted with an excess of aluminum hydroxide powder and the reaction products subsequently formed into a paste. Formation of the paste causes the reaction products to agglomerate thereby yielding a particle size distribution between about 100 and 1400 microns. The reaction products are subsequently dried, reduced in size and calcined to yield a catalyst precursor. The currently preferred catalyst precursor has a particle size distribution ranging from 70 μm to 150 μm. Conversion of the precursor to a catalyst entails placing the catalyst precursor within a reaction chamber suitable for use as a fluidized bed reactor. The catalyst precursor is fluidized and pre-heated to the desired reaction temperature by passing an inert gas selected from the group consisting of nitrogen, argon or helium through the reaction chamber. Upon achieving steady state conditions at the desired reaction temperature, the inert gas is replaced with a blend of ethylene and inert gas. The catalyst precursor converts to the desired catalyst during the first five minutes of contact with the blend of ethylene and inert gas. During the conversion process, cobalt and iron oxides are reduced to the respective metals. Additionally, a portion of the iron oxide is reduced to iron carbide (Fe$_3$C) and the molybdenum oxides are reduced to molybdenum carbide (Mo$_2$C).

Still further, the present invention provides a method of producing multi-wall carbon nanotubes wherein the resulting batch of multi-wall nanotubes has a narrow distribution as to the number of walls making up the nanotubes and a narrow distribution of external diameters for the resulting nanotubes. In the method of the current invention, the catalyst precursor is prepared as discussed above. Following conversion of the catalyst precursor to the reduced metal catalyst, flow of the ethylene/inert gas continues under the desired reaction conditions for a period of time sufficient to yield multi-wall carbon nanotubes. The ethylene/inert gas contains from about 10% to about 80% ethylene by volume and flows at a rate sufficient to fluidize the bed of catalyst particles. Following a reaction period of about 10 to about 30 minutes, the flow of gas to the reaction chamber is cut off and the particles carrying the multi-wall nanotubes are removed. About 95% to about 98% of the resulting carbon product carried by the spent catalyst is carbon nanotubes. From about 60% to about 90% of the resulting batch of multi-wall carbon nanotubes have from 3 to 6 walls and external diameters ranging from about 3 nm to about 7 nm. Thus, the present invention also provides a novel product comprising carbon nanotubes having 3 to 6 walls and external diameters ranging from about 3 nm to about 7 nm.

CATALYST AND METHODS FOR PRODUCING MULTI-WALL CARBON NANOTUBES

CROSS RELATED

This application claims the benefit of previously filed International Application PCT/US2010/042321 filed Jul. 16, 2010, and Provisional Application Serial. No. 61/226,438 filed on Jul. 17, 2009.

The present application claims priority to U.S. Provisional Application Ser. No. 61/226,438 filed on Jul. 17, 2009. The entirety of U.S. Provisional Application Ser. No. 61/226,438 is incorporated herein by reference.

BACKGROUND OF THE INVENTION

Carbon nanotubes are known to exist in single wall and multi-wall configurations. Each configuration provides certain benefits. Single wall nanotubes are preferred for electronic applications due to the low occurrence of structural anomalies. However, multi-wall nanotubes are generally lower in cost and will provide satisfactory performance in electronic applications if the number of walls forming the nanotubes can be controlled. Unfortunately, current methods for producing multi-wall carbon nanotubes lack the ability to control the resulting number of walls in the structure in the resulting nanotubes. As a result, currently produced multi-wall carbon nanotubes generally range in diameter from about 3 to 35 nm and comprise 3 to 40 concentric graphene layers, i.e. walls. The layers are coaxially arranged cylinders of carbon atoms having an interlayer distance of about 0.37 nm. This wide distribution range in walls and external diameter size limits the value of multi-wall nanotubes for electrical conductivity applications, thermal conductivity applications and mechanical reinforcement applications.

In contrast, multi-wall nanotubes, having a relatively narrow distribution range of walls and external diameters, will provide electrical conductivity characteristics approaching those of single wall nanotubes. Additionally, multi-wall nanotubes will provide such improvement at a lower cost. Further, multi-wall nanotubes batches having narrow distributions of wall numbers and external diameters will provide enhanced thermal conductivity and mechanical strength when compared to batches having wide distribution ranges.

While one might consider simply isolating a narrow distribution of multi-wall carbon nanotubes from the wide distribution ranges presently manufactured, technology does not exist for carrying out this task. Thus, the currently available multi-wall nanotubes are provided solely in batches or lots having the undesirable wide distributions of walls and external diameters.

As discussed in detail below, the present invention provides batches of multi-wall nanotubes having narrow distribution ranges of walls and diameters. When incorporated into thermoplastics the narrow distribution range batches provide electrical conductivity characteristics which rival single wall nanotubes and are significantly improved over currently available batches of multi-wall nanotubes. The current invention further provides catalysts and methods for preparing batches of multi-wall carbon nanotubes having narrow distribution ranges of walls and external diameters.

SUMMARY OF THE CURRENT INVENTION

In one embodiment, the present invention provides a catalyst precursor comprising alumina (Al$_2$O$_3$), magnesium

BRIEF DESCRIPTION OF THE FIGURES

FIG. 1 provides a tabular representation of the carbon yield and carbon nanotube diameter profile for various catalyst compositions on an alumina support.

FIG. 3 is a tabular representation of the effect of reaction temperature and gas composition on the carbon yield and selectivity to smaller diameter tubes.

DETAILED DESCRIPTION OF THE PREFERRED EMBODIMENTS

Figure 2A:
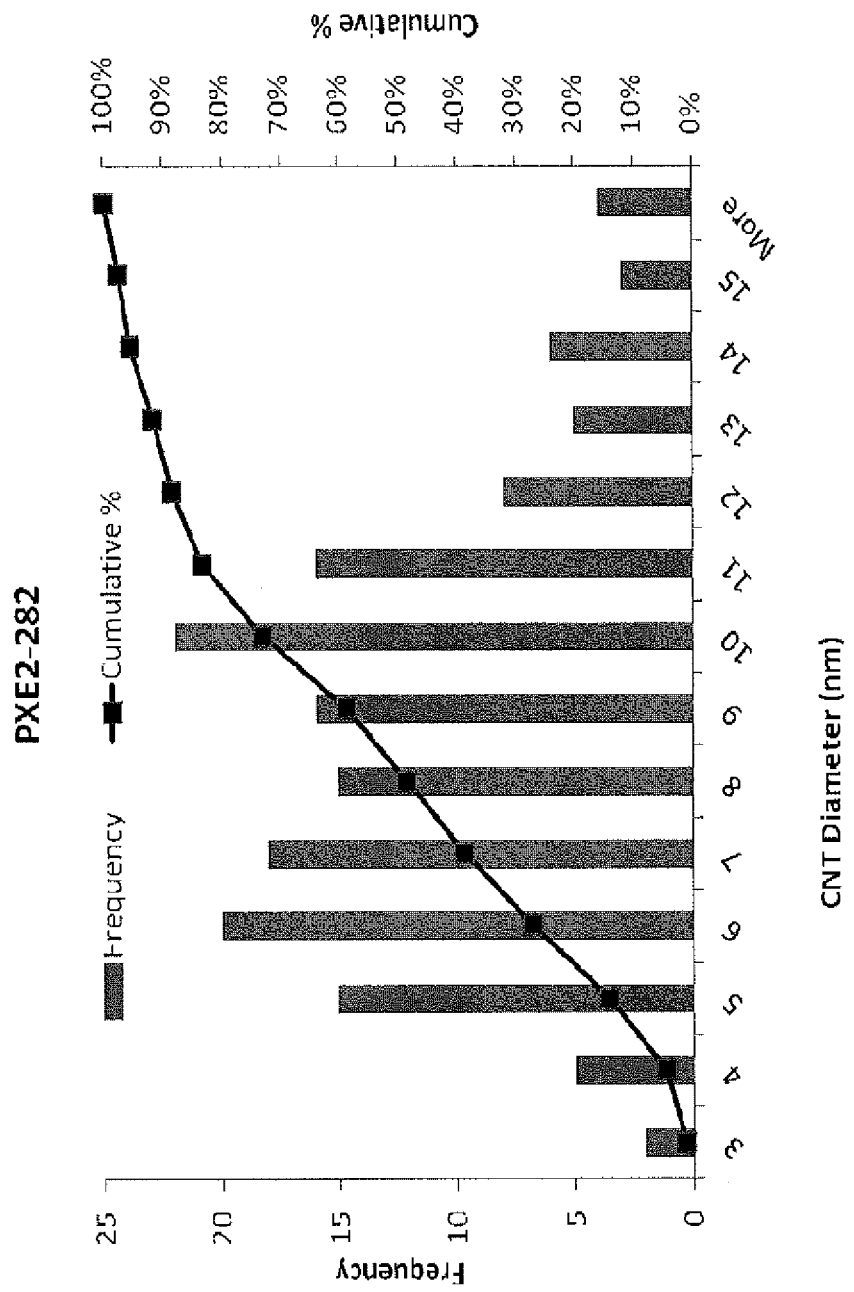
FIG. 2A provides graphical representations of the carbon nanotube diameter distribution for the catalytic composition corresponding to PXE2-282 in FIG. 1.
Figure 2B:
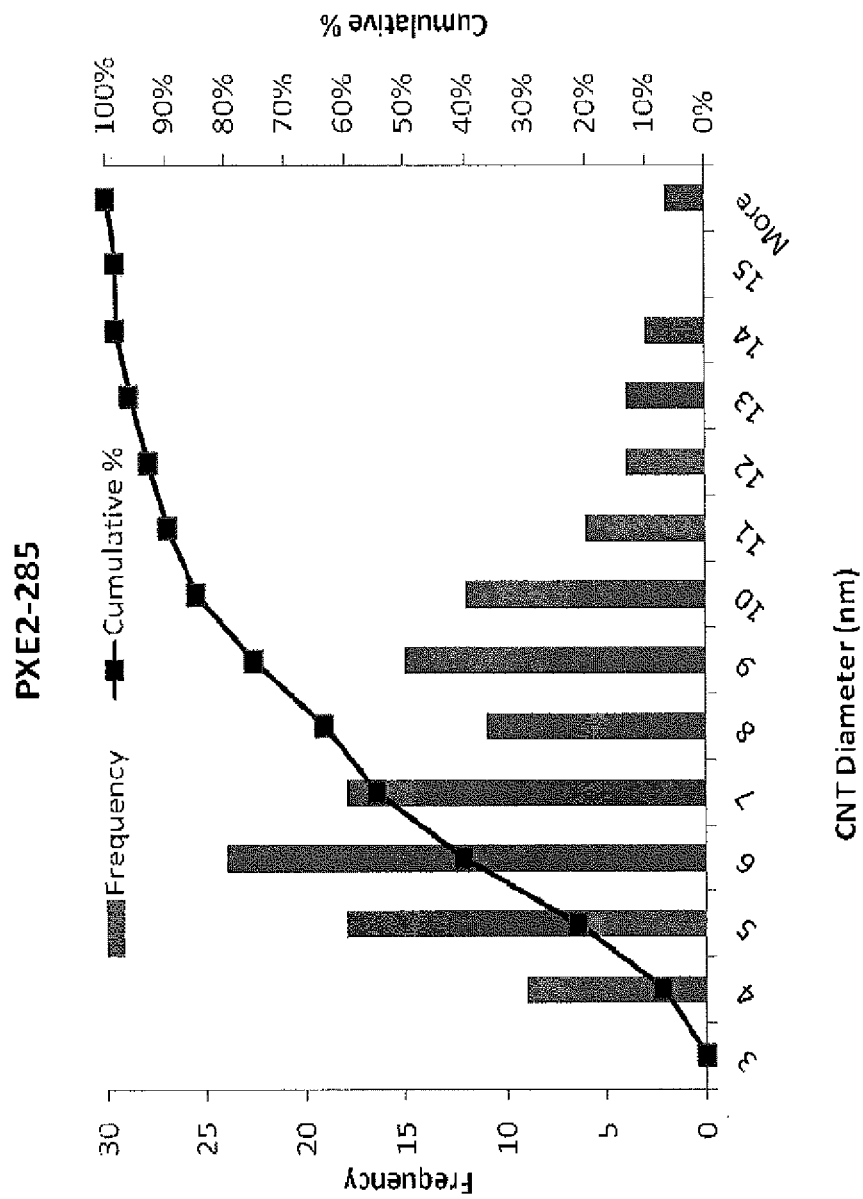
FIG. 2B provides graphical representations of the carbon nanotube diameter distribution for the catalytic composition corresponding to PXE2-285 in FIG. 1.
Figure 2C:
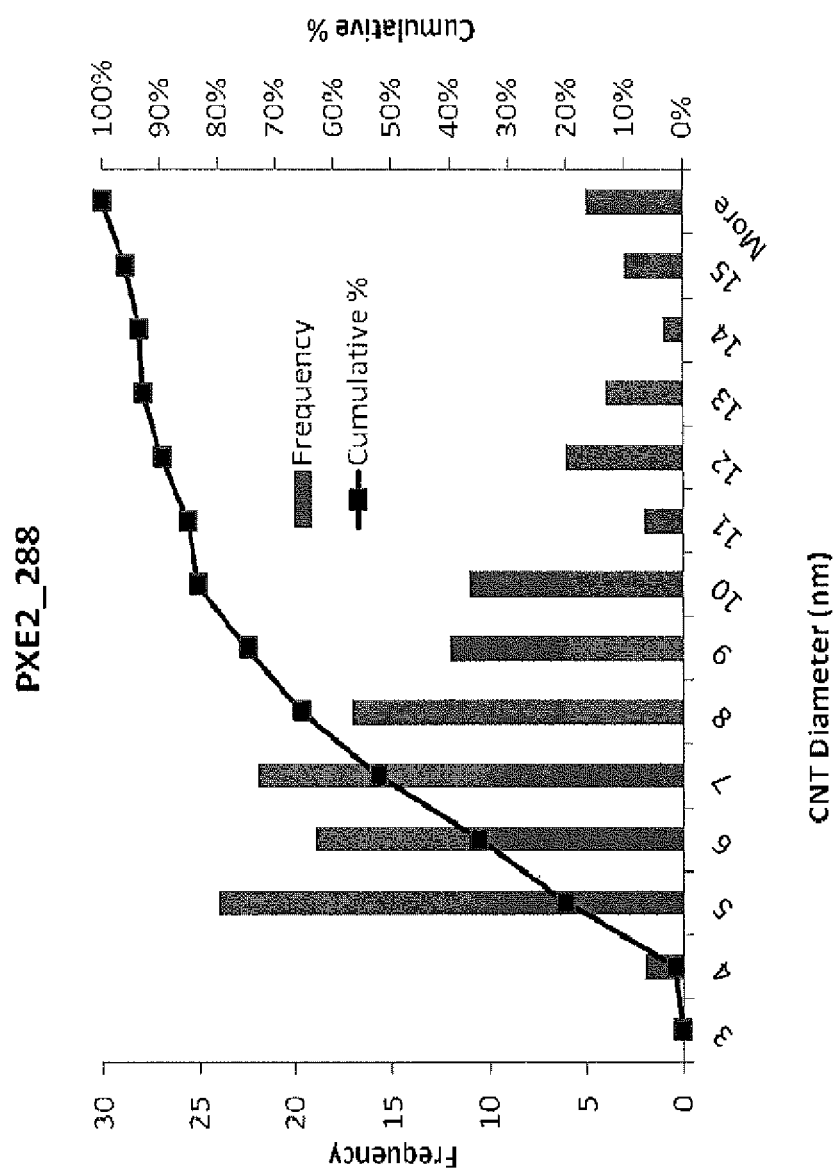
FIG. 2C provides graphical representations of the carbon nanotube diameter distribution for the catalytic composition corresponding to PXE2-288 in FIG. 1.
Figure 2D:
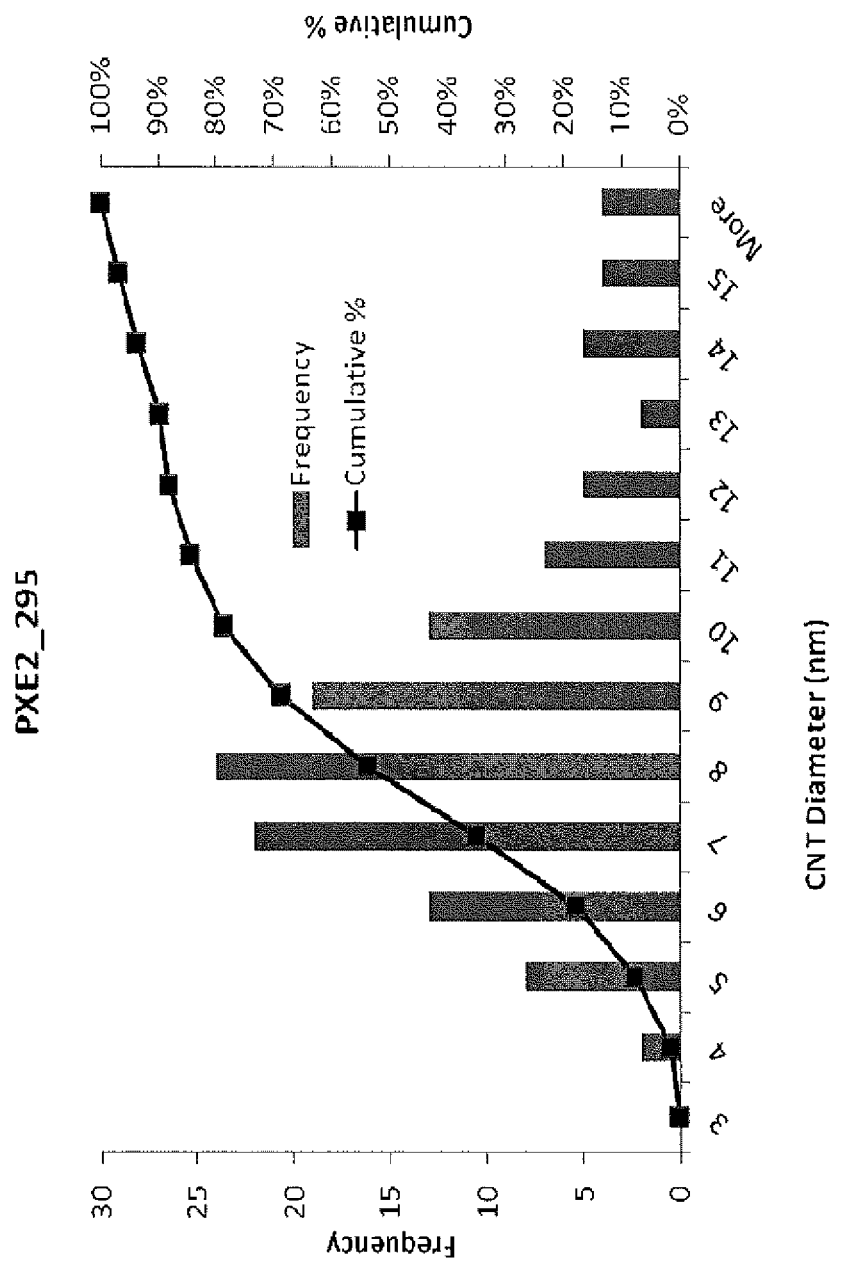
FIG. 2D provides graphical representations of the carbon nanotube diameter distribution for the catalytic composition corresponding to PXE2-295 in FIG. 1.
Figure 4A:
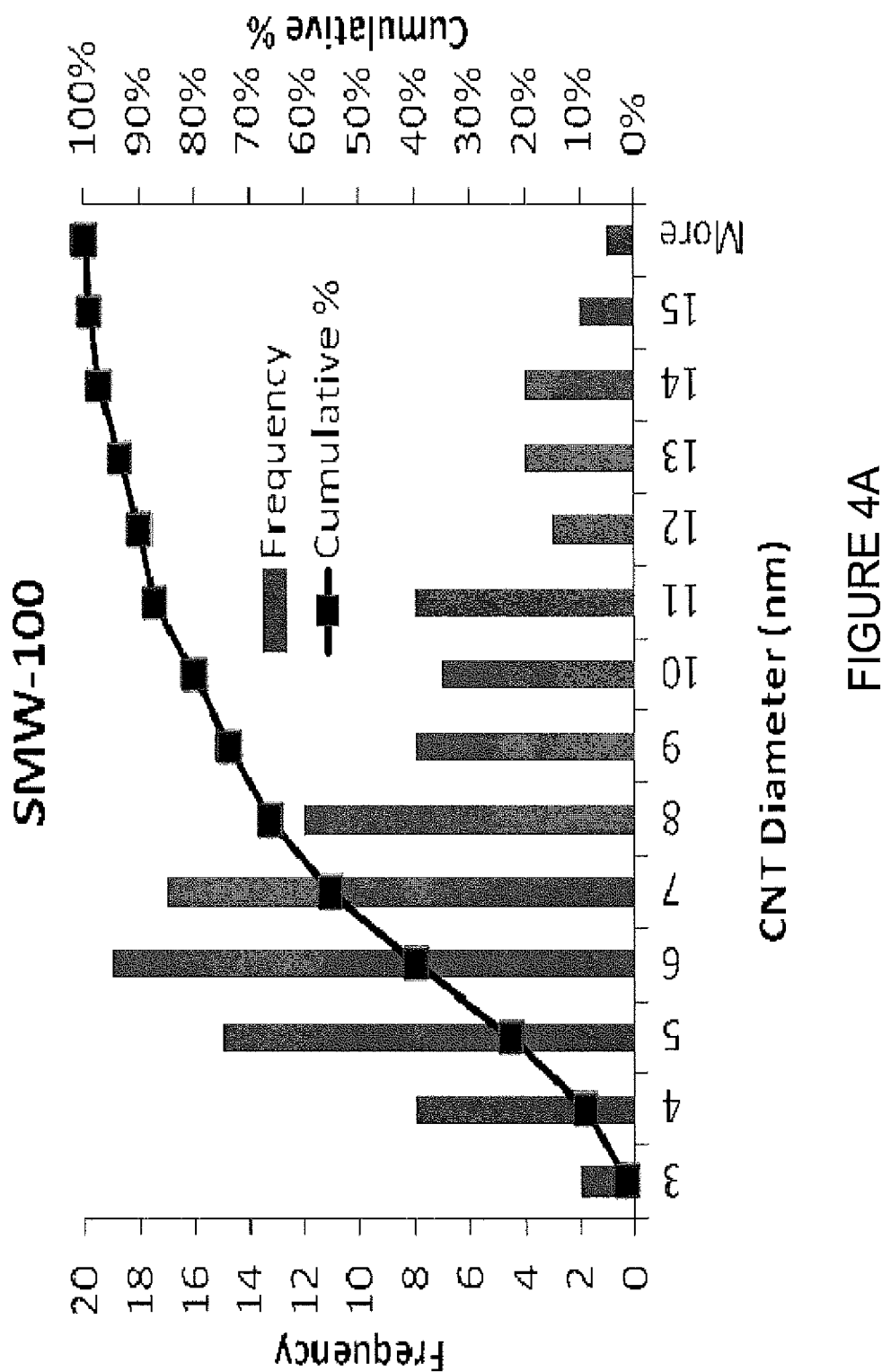
FIG. 4A depicts the carbon nanotube diameter distribution as determined by TEM corresponding to the SMW-100 carbon nanotube product.
Figure 4B:
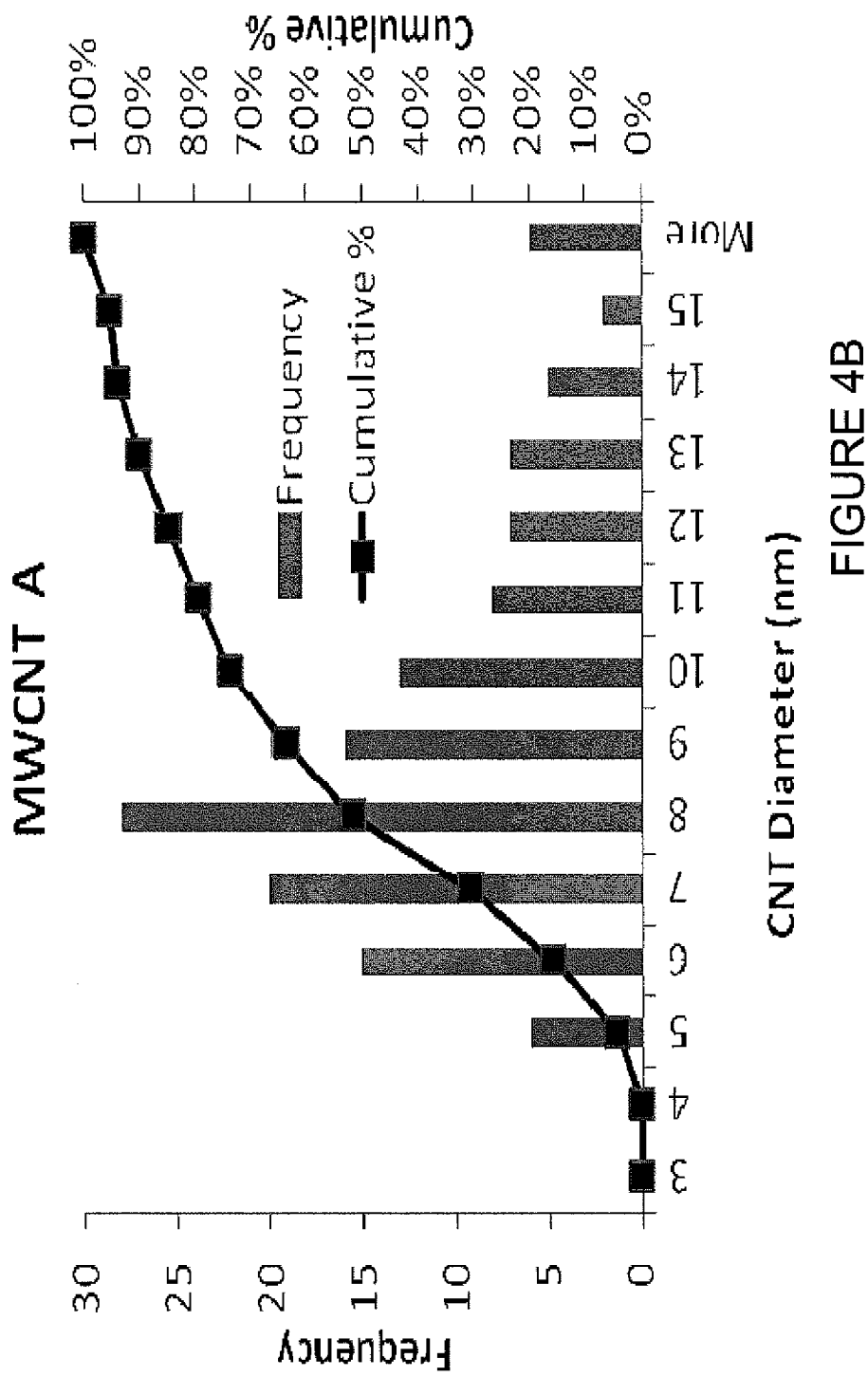
FIG. 4B depicts the carbon nanotube diameter distribution as determined by TEM corresponding to the MWCNT A carbon nanotube product.
Figure 4C:
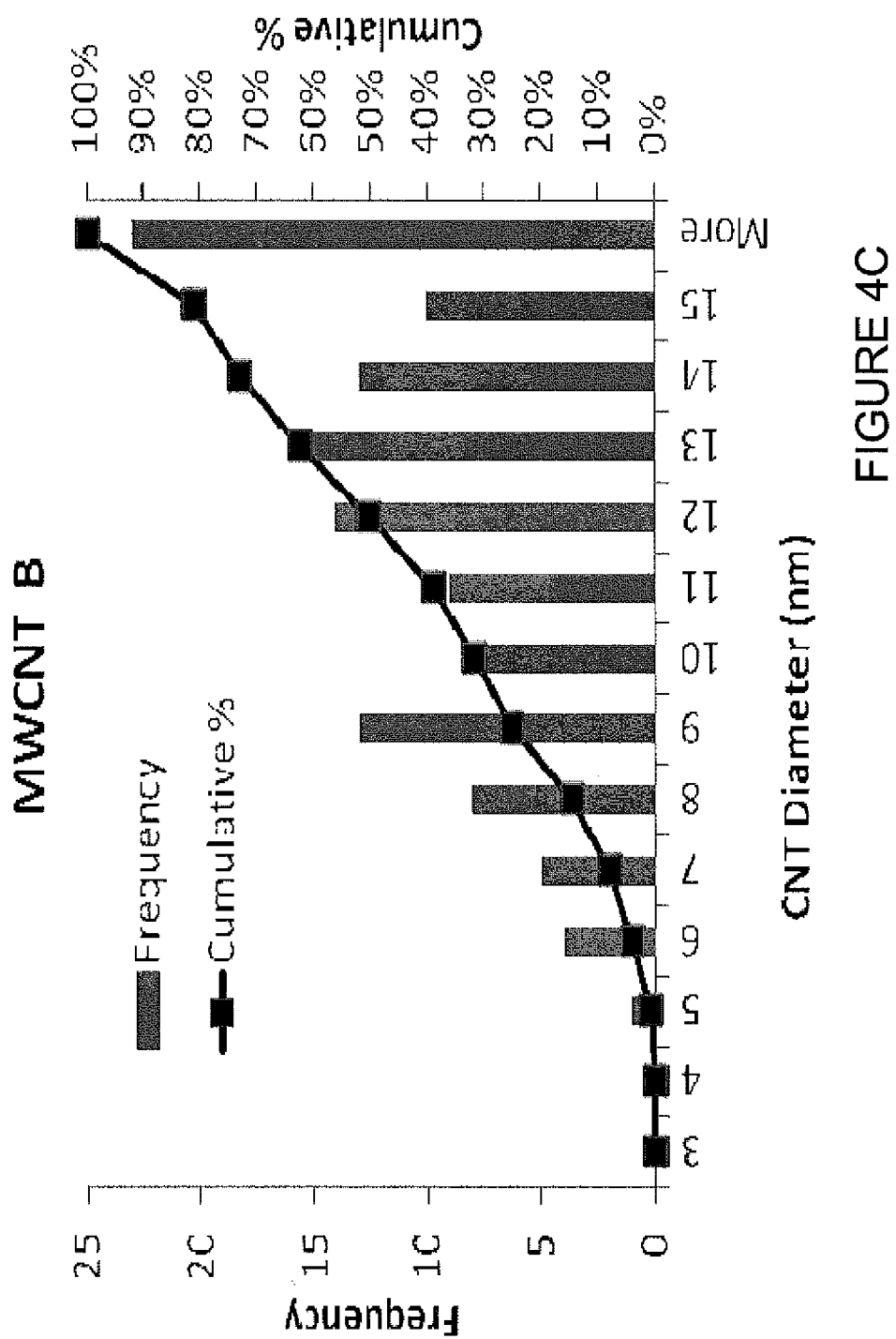
FIG. 4C depicts the carbon nanotube diameter distribution as determined by TEM corresponding to the MWCNT B carbon nanotube product.
Figure 4D:
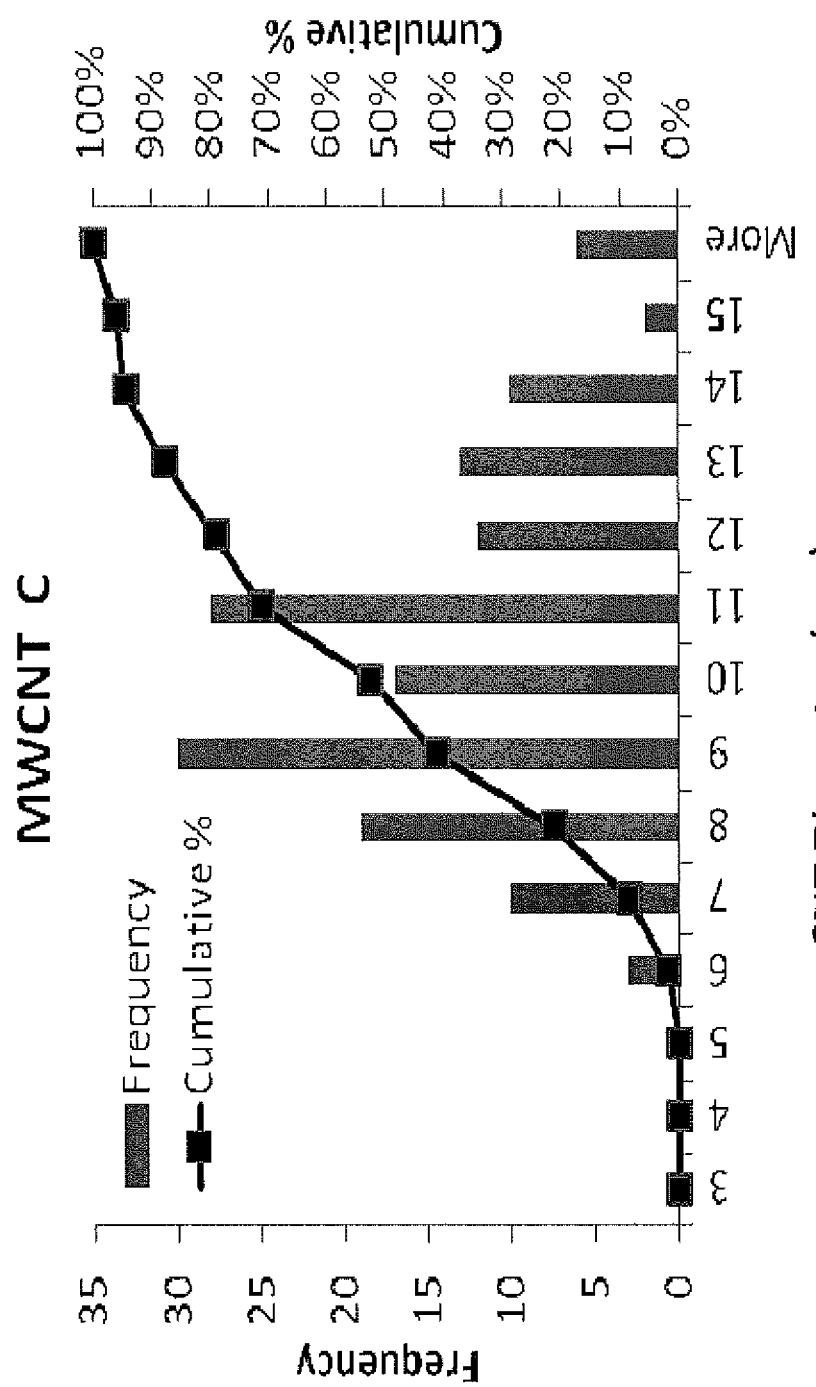
FIG. 4D depicts the carbon nanotube diameter distribution as determined by TEM corresponding to the MWCNT C carbon nanotube product.

The following detailed disclosure of the current invention will describe the catalyst precursor, methods of preparing the catalyst precursor and conversion thereof to the desired catalyst. Additionally, the present invention provides methods of producing batches of desired multi-wall carbon nanotubes on the catalyst wherein the carbon nanotube product has a narrow range distribution of walls and external diameters. As used herein, "carbon content" refers to the percentage of the final product (carbon nanotube+catalyst) that is carbon-based. So if 250 g of the final product is carbon and the final product is a total of 500 g, then carbon content is 50% or 50.0 (as used in FIG. 1). As used herein, "carbon yield" refers to the amount of carbon product produced relative to the amount of catalyst used in the reaction. It is defined by the following equation: (amount of carbon in final product (g)/amount of catalyst (g))×100. For example, a reaction that yields 250 g carbon product where 250 g of catalyst was used in the reaction would have a carbon yield of 100% ((250 g/250 g)×100=100%). As used herein, (including FIGS. 2A-2D; 2A-4D), "frequency" refers to the number of carbon nanotubes in a sample having a specified diameter (x axis). For example, in FIG. 2A, there are approximately 20 carbon nanotubes that have a diameter of about 6 nm.

1. The Catalyst Precursor and Catalyst

The catalyst precursor of the present invention has a surface phase of mixed metal oxides supported on a particle of alumina and magnesium aluminate. A mixed metal oxide is an oxide having two or more metal components. Additionally, the support of alumina/magnesium aluminate carries a surface treatment of magnesium oxide. The magnesium oxide carried by the alumina/magnesium aluminate particle is not necessarily an encompassing layer. The atomic ratio of MgO to $Al_2O_3$ is between about 0.02 and 0.04. Stated in other terms, for a ratio of 0.02:1, for every atom of MgO there are 50 atoms of $Al_2O_3$ while at a ratio of 0.04:1, for every atom of MgO there are 25 atoms of $Al_2O_3$. As noted below, a portion of the MgO used in these calculations will be converted to $MgAl_2O_4$.

The preferred surface phase of mixed metal oxides includes but is not limited to, one or more of the following: $CoFe_2O_4$, $CoMoO_4$, $Co_xMoO_4$, $Co_xFe_yMoO_4$, $Fe_2(MoO_4)_3$. Typically, the metal oxides provide the following percent by weight concentrations of metals on the catalyst precursor: Co from about 0.5% to about 2.0%; Mo from about 0.3% to about 2.0%; and, Fe from about 0% to about 3.0%. Thus, for $Co_xFe_yMoO_4$, x may range from about 1.6 to 6.5 and y may range from 0.1 to 10.5. More preferably, x will be about 3.3 and y will range from 2.6 to 6.3. In any event, a sufficient amount of the metal oxides are present on the catalyst precursor such that the resulting catalyst comprises the following percent by weights of the metal component: Co from about 0.5% to about 2.0%; Mo from about 0.3% to about 2.0%; and, Fe from about 0% to about 3.0%. In the resulting catalyst, the iron may be present as a reduced metal or a carbide ($Fe_3C$), while the molybdenum is present as a carbide ($Mo_2C$).

Preferably, the percent by weight of each metal component based on the weight of the catalyst precursor composition is: Co, from about 0.75% to about 1.5%; Mo, from about 0.5% to about 1.0%; and, Fe, from about 0.5% to about 2.0%. Accordingly, the active metal components are present in the following atomic ratios, wherein Mo is constant: the ratio of Co to Mo ranges from about 1.6 to about 6.5, more preferably from about 2.44 to about 4.88 and most preferred about 3.3; and the ratio of Fe to Mo from about 0 to about 10.5, more preferably about 1.75 to about 6.98 and most preferred about 2.62 to about 6.28.

The presence of Mg ions on the catalyst support reduces the number of strong acid sites on the surface of the Alumina support. By reducing the number of strong acid sites on the surface of the catalyst support, use of the improved catalyst will produce primarily carbon nanotubes and significantly less amorphous carbon or other carbon products. As discussed below, catalytic reactions using the improved catalyst produce at least 90% and preferably greater than 98% carbon nanotubes as the resulting carbon product.

The catalyst precursor of the present invention preferably has a particle size between about 20 μm and about 500 μm. Preferably, the particle size is between about 20 μm and 250 μm. More preferably, the catalyst precursor has a particle size between about 20 μm and about 150 μm. In the currently preferred method discuss below, the particles range in size from about 70 μm to about 150 μm.

The catalyst precursor described above is converted to catalyst particles by reduction of the metal oxides to the respective metals and metal carbides, i.e. Fe°, Fe$_3$C, Co° and Mo$_2$C. The catalyst particles have the same atomic ratios of metal present as the catalyst precursor. The resulting nano-sized deposits of metallic cobalt and metallic iron will determine the interior diameter of the multi-wall nanotubes produced on the catalyst particles. Additionally, the presence of the Mo$_2$C, disperses or spaces the metallic cobalt, thereby precluding sintering of the cobalt and providing the desired cobalt particle size. In general, the resulting metal deposits on the support will have diameters ranging from about 1.5 urn to about 3.0 nm. Preferably, the resulting metal deposits of reduced iron and reduced cobalt will have diameters ranging from about 1.5 nm to about 2.2 nm. Additionally, as noted above, the final catalyst particles have fewer surface acid sites than catalyst particles utilizing only alumina as a support.

In summary, the final catalyst particles of the present invention have particle sizes between about 20 μm and about 500 μm. Preferably, the particle size is between about 20 μm and 250 μm. More preferably, the catalyst precursor has a particle size between about 20 μm and about 150 μm. In the currently preferred method of making multi-wall nanotubes discussed below, the presently preferred particle size is about 70 μm to about 150 μm. The catalyst particles comprise:

a. gamma alumina (γ-Al$_2$O$_3$) between about 91.0% and 97.6% by weight, preferably between about 94.8% and about 97.3% by weight;

b. Mg (in the form of MgO and MgAl$_2$O$_4$) between about 0.5% and about 3.3% by weight, preferably between 0.5% and 1.0%;

c. reduced Co from about 0.5% to about 2.0% by weight, preferably from about 0.75% to about 1.5% by weight;

d. Mo, in the form of Mo$_2$C from about 0.3% to about 2.0% by weight, preferably from about 0.5% to about 1.0% by weight; and, e. Fe, in the form of reduced iron and iron carbide (Fe°, Fe$_3$C) from about 0% to about 3.0% by weight, preferably from about 0.5% to about 2.0% by weight.

Typically, less than 2.0% by weight of the catalyst particle will be metal carbides. The atomic ratios of the reduced metals for catalytic production of multi-wall carbon nanotubes will not vary substantially from the catalyst precursor as the metal carbides are not produced in substantial quantities.

2. Method of Preparing the Catalyst Precursor Particles and Catalyst Particles

The current invention provides methods for manufacturing a catalyst precursor and a catalyst suitable for the catalytic formation of multi-wall carbon nanotubes. In particular, the catalyst of the current invention enables the production of batches of multi-wall carbon nanotubes having a narrow distribution range of walls and diameters.

In a preferred embodiment, the method initially involves preparing a solution of mixed metallic compounds comprising two or more of the following: a cobalt compound selected from the group consisting of cobalt acetate, cobalt nitrate; an iron compound selected from the group consisting of iron acetate, iron nitrate; a molybdenum compound selected from the group consisting of ammonium heptamolybdate and ammonium dimolybdate; and magnesium nitrate. The preferred solution comprises cobalt acetate, iron nitrate, ammonium heptamolybdate and magnesium nitrate in water.

Regardless of the cobalt compound chosen, the solution contains a concentration of cobalt ion between about 20 g/L and about 50 g/L; a concentration of molybdenum ion between about 10.5 g/L and about 70.3 g/L; a concentration of iron ion between about 35 g/L and about 105 g/L; and, a concentration of Mg ion between about 6.7 g/L to about 27.0 g/L. The preferred solution contains between about 26.7 g/L and about 40.0 g/L cobalt ion; between about 17.6 g/L and about 35.2 g/L molybdenum ion; between about 52.7 g/L and about 70.1 g/L iron ion; and, between about 6.7 g/L and about 13.5 g/L magnesium ion. Most preferred is a solution of about 33.4 g/L cobalt ion; of about 17.6 g/L molybdenum ion; of about 63.1 g/L iron ion; and, about 6.7 g/L magnesium ion. Proper selection of the metal ion concentration will enhance the formation of the desired mixed metal oxides. Thus, it is desirable to provide the proper stoichiometric ratios of the metals in solution to achieve this result.

The above referenced metal ions are then reacted with aluminum hydroxide to yield a mixture of metal hydroxides and other ionic compounds including, but not limited to, the following hydroxides where the stoichiometric ratios may be varied from that shown: Mg(OH)$_2$, Fe(OH)$_3$, Co(OH)$_2$, CoMoO$_4$.nH$_2$O, Fe$_2$(MoO$_4$)$_3$.nH$_2$O. Typically the foregoing reaction takes place at room temperature over a period of about two to four hours. The reaction products have a paste like consistency which promotes agglomeration of the particles. Preferably, the paste has a moisture content of about 20% to about 40% water by weight. More preferably, the paste contains from about 25% to about 30% water by weight.

If necessary for agglomeration of the particles, the paste-like product is manipulated to yield agglomerated particles having particle sizes ranging from about 100 μm to about 1400 μm. Typically, the particles will agglomerate during the reaction. Preferably, the agglomerated particles are between about 100 μm to about 500 μm. In the preferred process, the agglomerated particles are mixed in a machine which kneads or mixes the paste for about 20 to about 50 minutes. Following the kneading, the product is allowed to age for about 2 to 3 additional hours. The total time period will depend upon the batch size. For batches of about 200 to about 2000 grams, the preferred kneading period will be about 30 minutes. Larger batches will require longer mixing times. Following agglomeration, the particles are dried and sieved to isolate particles less than 1400 μm. Preferably, the sieving step provides particles in the range of about 100 μm to about 500 μm.

The agglomerated particles are dried to a moisture content of about 10% to about 20% water by weight. Preferably, the dried particles have less than 15% water by weight. The drying step preferably takes place at a temperature between about 30° C. and 50° C.

Following drying and sieving, the particles are calcined under a flowing gas at a temperature between about 400° C. to about 600° C. for a period of about 3 hours to about 8 hours. More preferably, the calcining step takes place at a temperature between about 400° C. and 500° C. for a period of about 3.5 hours to about 4.5 hours. Most preferably, the calcining step occurs at a temperature of about 440° C. to about 460° for a period of about 3.5 hours to about 4.5 hours. Preferably, the calcining gas is selected from air, nitrogen, helium and mixtures thereof. Typically, the preferred calcining gas is a gas that is inert under the calcining conditions. The drying and calcining steps reduce the agglomerated particles to a particle size between about 20 μm and 500 μm. Alternatively, prior to calcining the particles are sieved and if necessary ground such that calcining will produce particles between 20 μm and 250 μm. Preferably, calcining produces particles between about 20 μm and 200 μm. More preferred are particles between about 20 μm and 150 μm. In the preferred method discussed below, the preferred particles range in size from about 70 μm to about 150 μm. The resulting particles are essentially free of water moisture, i.e. no greater than 3% moisture by weight.

Calcining of the particles converts the metal hydroxides to the respective oxides. For example, calcining of iron hydroxide with molybdate yields iron-molybdate ($Fe_2(MoO_4)_3$). Likewise, calcining cobalt hydroxide with molybdate yields cobalt-molybdate ($CoMoO_4$). Further, during the calcining process $Fe(OH)_3$ and $Co(OH)_2$ combine to yield $CoFe_2O_4$. Finally, during calcining $Mg(OH)_2$ yields MgO and the aluminum hydroxide ($Al(OH)_3$) converts to gamma alumina, i.e. $\gamma$-$Al_2O_3$. During the calcining process, the oxidation of $Mg(OH)_2$ also precludes the formation of strong acid sites on the surface of the $\gamma$-$Al_2O_3$. The resulting surface configuration is believed to be a mixed oxide similar to Mg—Al—O. In any event, the surface acidity of the $\gamma$-$Al_2O_3$ carrying the MgO is significantly lower than the surface acidity of $\gamma$-$Al_2O_3$ when calcined without $Mg(OH)_2$ present.

Further, during the calcining process, in addition to forming the respective oxides of magnesium and aluminum, a portion of the $Mg^{+2}$ ions adjacent to the aluminum hydroxide produces a parallel reaction. In this reaction, the solubility of the magnesium ion in the alumina allows the magnesium to displace a portion of the aluminum oxide tetrahedral structure near the surface of the particle thereby producing magnesium aluminate ($MgAl_2O_4$), a compound with a spinel like structure. The formation of magnesium aluminate is favored over the formation of $CoAl_2O_4$ and $FeAlO_3$. Thus, the favored reaction preserves the catalytic metals for reduction and conversion to catalyst sites on the surface of the resulting support particle. In particular, the reduced cobalt takes the form of nanoparticle size domains on the surface of the resulting support, the iron becomes reduced iron and iron carbide and the molybdenum becomes molybdenum carbide. The iron carbide and reduced iron disperse the cobalt on the surface of the catalyst support thereby controlling the inner diameter of the resulting nanotubes.

The resulting catalyst support has a configuration wherein magnesium aluminate is incorporated into the crystalline structure of the $\gamma$-$Al_2O_3$ primarily in the outer layer of the particle. Additionally, the surface of the gamma alumina carries MgO. Without being limited by theory, the MgO on the surface is likely a mixed oxide with the alumina of the particle, i.e. a mixed oxide of Mg—Al—O. This configuration results from the reaction of the magnesium ions with the alumina during the calcining process. Finally, the preferred catalyst support is preferably free of $CoAl_2O_4$ and $FeAlO_3$. If $FeAlO_3$ is present then preferably, the catalyst support comprises less than 0.5 percent by weight $FeAlO_3$. If $CoAl_2O_4$ is present then preferably, the catalyst support comprises less than 0.5 percent by weight $CoAl_2O_4$.

The presence of magnesium on the surface of the catalyst support particle reduces the surface acidity of the catalyst precursor support particle and the resulting catalyst support particle. By reducing the number acid sites on the surface of the support particle, the method of the current invention improves the production of carbon nanotubes and reduces the formation of other carbon types during the subsequent production of multi-wall carbon nanotubes. Additionally, by blocking the formation of $CoAl_2O_4$ and $FeAlO_3$ the presence of the magnesium ion precludes the loss of catalytic metals.

Following calcining and particle size reduction, the resulting catalyst precursor particles have a catalyst support of $\gamma$-$Al_2O_3$/$MgAl_2O_4$ with a surface treatment of MgO. Additionally, the surface of the catalyst support carries a mixed phase of the referenced metal oxides. As noted above the preferred mixed metal oxides include but are not necessarily limited to: $CoFe_2O_4$, $CoMoO_4$, $Co_xMoO_4$, $Fe_2(MoO_4)_3$, $Co_xFe_yMoO_4$ with $Co_xFe_yMoO_4$ being the most preferred.

The resulting catalyst precursor is placed within a reaction chamber. Preferably, the reaction chamber is designed to produce a fluidized bed of catalyst particles when a flowing gas passes through the chamber and the particles located therein. To finally convert the catalyst precursor to a catalyst, the precursor must be heated and reacted with a carbon containing gas. In the following method for producing multi-wall nanotubes, the preferred gaseous carbon compound is ethylene. The conversion of the catalyst precursor to catalyst takes place at a temperature between about 600° C. and 700° C. during the first ten minutes of contact with the gaseous carbon compound. During this time period, the metal oxides are reduced to the respective metals and metal carbide discussed above. Additionally, the formation of the $Fe_3C$ and $Mo_2C$ preclude sintering and agglomeration of the reduced cobalt and iron on the surface of the support. Thus, the resulting nanoparticles of reduced cobalt preferably have diameters between about 1.5 nm to about 3.5 nm. More preferably, the reduced cobalt metal particles on the surface of the catalyst support have diameters between about 1.5 nm and 2.2 nm. The reduced iron particles will have similar sizes, i.e. from about 1.5 nm to about 3.5 urn preferably between about between about 1.5 nm and 2.2 nm.

The resulting catalyst comprises a support of $\gamma$-$Al_2O_3$/$MgAl_2O_4$ with a surface treatment of MgO and nano size particles of $Fe_3C$ and $Mo_2C$ on the surface of the support. The reduced metallic cobalt may be carried by the $\gamma$-$Al_2O_3$/$MgAl_2O_4$ and may also be found on the molybdenum carbide ($Mo_2C$) and iron carbide ($Fe_3C$). Additionally, reduced iron may be carried by the $\gamma$-$Al_2O_3$/$MgAl_2O_4$ and may also be found on the molybdenum carbide ($Mo_2C$) and iron carbide ($Fe_3C$).

As discussed above the resulting catalyst particles have particle sizes between about 20 μm and about 500 μm. Preferably, the particle size is between about 20 μm and 250 μm. More preferably, the catalyst has a particle size between about 20 μm and about 150 μm. In the currently preferred method of making multi-wall nanotubes, the presently preferred particle size is about 70 μm to about 150 μm.

The catalyst particles comprise: gamma alumina ($\gamma$-$Al_2O_3$) between about 91.0% and 97.6% by weight, preferably between about 94.8% and about 97.3% by weight; Mg (in the form of MgO and $MgAl_2O_4$) between about 0.5% and about 3.3% by weight, preferably between 0.5% and 1.0%; reduced Co from about 0.5% to about 2.0% by weight, preferably from about 0.75% to about 1.5% by weight; Mo, in the form of $Mo_2C$ from about 0.3% to about 2.0% by weight, preferably from about 0.5% to about 1.0% by weight; and, Fe, in the form of reduced iron and iron carbide ($Fe°$, $Fe_3C$) from about 0% to about 3.0% by weight, preferably from about 0.5% to about 2.0% by weight. Typically, less than 2.0% by weight of the catalyst particle will be metal carbides. The atomic ratios of the reduced metals for catalytic production of multi-wall carbon nanotubes will not vary substantially from the catalyst precursor as the metal carbides are not produced in substantial quantities.

In an alternative method for preparing the catalyst precursor, the magnesium nitrate has been omitted from the initial solution. In this method, magnesium hydroxide powder is combined with the aluminum hydroxide powder and reacted with the solution of metallic compounds comprising a cobalt compound selected from the group consisting of cobalt acetate, cobalt nitrate, an iron compound selected from the group consisting of iron acetate, iron nitrate, a molybdenum compound selected from the group consisting of ammonium heptamolybdate and ammonium dimolybdate and mixtures thereof. The preferred solution comprises cobalt acetate, iron nitrate, ammonium heptamolybdate and magnesium nitrate in water.

Regardless of the cobalt compound chosen, the solution contains a concentration of cobalt between about 20 g/L and about 50 g/L; a concentration of molybdenum ion between about 10.5 g/L and about 70.3 g/L; a concentration of iron ion between about 35 g/L and about 105 g/L; and, a concentration of Mg ion between about 6.7 g/L to about 27.0 g/L. The preferred solution contains between about 26.7 g/L and about 40.0 g/L cobalt ion; between about 17.6 g/L and about 35.2 g/L molybdenum ion; between about 52.7 g/L and about 70.1 g/L iron ion; and, between about 6.7 g/L and about 13.5 g/L magnesium ion. Most preferred is a solution of about 33.4 g/L cobalt ion; of about 17.6 g/L molybdenum ion; and about 63.1 g/L iron ion.

The solution of metal ions is subsequently reacted with an excess of aluminum hydroxide powder having particles ranging in size from about 20 μm to about 150 μm and magnesium hydroxide powder having particles ranging in size from about 20 μm to about 150 μm. Following this reaction, the preparation of the catalyst precursor and the subsequent catalyst is identical to the process described above.

Manufacture of Multi-Wall Carbon Nanotube Batches having Narrow Distribution Ranges of Walls and Diameters The following discussion concerning the catalytic production of multi-wall carbon nanotubes is essentially a continuation of the discussion above concerning the preparation of the catalyst precursor and the catalyst. Following placement of the calcined catalyst precursors in the reactor chamber, the particles are fluidized and converted to catalyst particles. As noted above, the catalyst may have particle sizes between about 20 μm and about 500 μm. Preferably, the particle size is between about 20 μm and 250 μm. More preferably, the catalyst precursor has a particle size between about 20 μm and about 150 μm. In the currently preferred method of making multi-wall nanotubes, the presently preferred particle size is about 70 μm to about 150 μm. Thus, the particles are well suited for use in a fluidized bed reactor.

Following placement of the catalyst precursor particles in the reaction chamber, a flowing stream of nitrogen gas passes through the reaction chamber thereby fluidizing the bed of particles. The nitrogen gas is heated to a temperature sufficient to raise the temperature within the fluidized bed to a range of about 600° C. to about 700° C. Alternatively, the reaction chamber may be located in a furnace or other suitable heating device. When located within a furnace, the reaction chamber will typically be heated by both the furnace and the gas. More preferably, the fluidized bed is pre-heated to a temperature between about 600° C. to about 650° C. Most preferably, the fluidized bed is pre-heated to about 610° C. to about 630° C. One skilled in the art will recognize that other non-reactive gases such as argon or helium may be substituted for nitrogen. The primary requirement for the pre-heating step is fluidization and heating of the fluidized bed to the desired temperature without undesirable side reactions.

Upon stabilization of the temperature within the fluidized bed, the gas flow to the bed is switched from nitrogen to a reactive gas. The reactive gas is a non-reactive carrier gas with a carbon containing gas. The preferred carrier gas is nitrogen and the preferred carbon containing gas is ethylene; however, other carrier gases such as argon or helium will perform equally well. The preferred blend of ethylene in nitrogen by volume is between about 10% and 80% by volume. More preferably, the reactive gas contains from about 20% to about 50% by volume ethylene in nitrogen. Most preferred is a reactive gas containing from about 20% to about 40% by volume ethylene in nitrogen.

The flow rate of the ethylene containing gas is not dependent upon the size of the reaction chamber. Rather, the volume of gas passing through the reaction chamber depends upon the grams of catalyst precursor within the reaction chamber. The flow rate will be from about 70 L/min per kg of catalyst precursor to about 150 L/min per kg of catalyst precursor. More preferably, the flow rate will range between about 90 L/min per kg of catalyst precursor to about 120 L/min per kg of catalyst precursor.

The initial reaction of the ethylene containing gas with the catalytic particles reduces the metal oxides to their respective metals ($Co°$ and $Fe°$) and metal carbides ($Mo_2C$ and $Fe_3C$). This reduction step generally occurs over the first five minutes of the reaction process. Preferably, the reaction temperature is 600° C. to 750° C. More preferably, the reaction temperature is between 610° C. and 650° C. Most preferably, the reaction temperature is 610° C. Additionally, during the first ten minutes of the reaction process, the ongoing reaction of ethylene with the catalyst precursor and subsequent catalyst particles is an exothermic reaction. Thus, the preferred method maintains the temperature of the fluidized bed below 670° C. Temperature maintenance may be achieved by lowering the temperature of the gas entering the reaction chamber. If a furnace is used, then the temperature of the furnace may also be reduced. Preferably, the temperature is maintained below 650° C. as higher temperature will lead to an increased production of amorphous carbon. As the metal oxides are reduced, the ethylene gas contacts the resulting catalytic particles and begins to grow multi-wall carbon nanotubes. Following the reduction of metal oxides to catalytic particles, the reaction process continues for about 10 to about 40 minutes. More preferably, the reaction process following the reduction of metal oxides continues for about 15 to 25 minutes.

The resulting carbon product carried by the now spent catalyst particles is 98% free of amorphous carbon and other carbon forms. Thus, 98% of the carbon product is multi-wall carbon nanotubes. Further, the resulting multi-wall carbon nanotubes primarily have from 3 to 8 walls. More preferably, the resulting nanotubes carried by the spent catalyst particles primarily have from 3 to 6 walls and external diameters between about 4.0 nm to about 7.0 nm. Preferably, at least 60% of the resulting multi-wall carbon nanotubes have three to six walls and external diameters between about 4.0 nm and about 7.0 nm. More preferable, the method of the current invention yields multi-wall carbon nanotubes wherein at least 75% of the resulting multi-wall carbon nanotubes having the desired narrow distribution range of 3 to 6 walls and diameters between about 4.0 nm and 7.0 nm. More preferably, at least 85% of the resulting nanotubes carried by the spent catalyst have three to six walls and external diameters between about 4.0 nm and about 7.0 nm. Most preferably, with continuously maintained fluidization of the catalyst particles, the present invention will provide spent catalyst carrying multi-wall carbon nanotubes wherein 90% of the resulting multi-wall nanotubes will have 3 to 6 walls and diameters between about 4.0 nm and about 7.0 nm.

The following examples and test data do not limit the nature of the current invention. Rather, this information will enhance the understanding of the current invention.

Example 1

Objective

This example demonstrates the effect of various catalyst metal compositions on carbon yield and carbon nanotube diameter.

Methods

A variety of catalyst precursors were prepared to demonstrate the importance of the catalytic metals on the resulting multi-wall product. The table in FIG. 1 identifies the nanotube products produced for this comparison. For these examples, 600 grams of catalyst precursor prepared as discussed above, having particles sizes of 150 to 300 microns, were placed in a fluidized bed reactor. As discussed above, the method of the current invention converts the catalyst precursor to catalyst and subsequently grows multi-wall carbon nanotubes on the resulting catalyst. For each of the examples provided in FIG. 1, the final catalysts were reacted at 610° C. with 40% ethylene in nitrogen at a gas flow rate of 60 L/min (gas flow/mass of catalyst ratio of 100 L/min per Kg catalyst) for 20 minutes.

Results

As depicted in FIG. 1, the catalytic metal composition significantly impacts the resulting multi-wall nanotube product. For example, runs PXE2-282, PXE2-285, PXE2-292 and PXE2-293, provide data regarding multi-wall carbon nanotubes prepared with catalyst precursors having Co, Mo and from about 0.75 percent weight of iron to about 1.9 percent weight of iron. The resulting batch of nanotubes have a high yield of carbon nanotubes with a median external diameter from about 6.72 nm to about 8.24 nm and a mode external diameter from about 4.97 nm to about 6 nm. Between 75% and 85% of these carbon nanotubes have external diameters of less than 10 nm. Specifically, PXE2-282 represents a batch of multi-wall nanotubes having a mode diameter of 6.0 nm, the median diameter for the batch is 8.24 nm and 73% of the batch had diameters less than 10 nm. Similarly, PXE2-285 represents a batch of multi-wall nanotubes having a mode diameter of 5.38 nm, the median diameter for the batch is 6.72 nm and 85% of the batch had diameters less than 10 nm. The values for PXE2-292 and PXE2-293 can be easily determined from FIG. 1. As known to those skilled in the art, the term "mode" when used in this manner represents the value that occurs the most frequently in a data set. Thus, for PXE2-285, the most common diameter for nanotubes within the batch is 6.72 nm.

These results demonstrate that catalyst precursor compositions comprising Co from about 0.75 to about 1 percent weight of total metals of catalyst precursor, Fe from about 0.75 to about 1.9 percent weight of total metals of catalyst precursor, and Mo from about 0.4 to 0.5 percent weight of total metals of catalyst precursor, result in high percentage yields of small diameter carbon nanotubes.

In contrast, catalyst precursor particles lacking iron result in a significant reduction in carbon yield. For example, run PXE2-288 demonstrates a 57% loss in carbon yield when iron is removed from the precursor catalyst formulation. Interestingly, the resulting product comprises carbon nanotubes with a median external diameter of 6.98 and a mode external diameter of 4.68. This suggests that iron is not responsible for the small diameter of the resulting carbon nanotubes. However, the results seem to suggest that molybdenum plays a role in limiting carbon nanotube diameter. For example, run PXE2-284, produced carbon nanotubes having a median and mode external diameter of 9.63 nm and 11.06 nm, respectively. Additionally, only 54% of the resulting carbon nanotubes had an external diameter less than 10 nm compared to 85% in run PXE2-285, where Mo was used in the precursor composition. FIGS. 2A-2D further illustrates the effect of removing either Fe or Mo from the catalyst precursor on carbon nanotube diameter distribution. Taken together, these results demonstrate that iron acts to maintain carbon yield while molybdenum promotes production of a smaller diameter carbon nanotube.

Example 2

Objective

With reference to FIG. 3, this example demonstrates the effect of reaction temperature and gas composition on carbon yield and carbon nanotube diameter.

Methods

Catalyst compositions having the formulations of PXE2-282 and PXE2-285 in FIG. 1 were used in this test as a reference. To determine the impact of reaction temperature on the resulting nanotube product, reactions were carried out at temperatures between 610-675° C. Further, these tests determined the impact on the resulting nanotube product due to changes in ethylene concentration in the gas feed for variations of ethylene concentration between 30-40%.

Results

Increasing the reaction temperature and/or lowering the gas composition from 40% to 30% ethylene decreases the carbon yield and increases the diameter of the carbon nanotubes. Thus, in order to maximize carbon yield and to produce small diameter carbon nanotubes, the catalytic reaction should occur at about 610° C. with a reactive gas mixture containing 40% ethylene.

Example 3

Objective

This example compares the electrical conductivity of composites containing primarily small diameter multi-wall carbon nanotubes having between 3-6 walls (diameters of 4-8 nm) to composites comprising larger diameter carbon nanotubes. This example and the following examples utilize the material prepared according to the current invention and identified as PXE2-282 in FIG. 1 (referred to as SMW-100).

Methods

Carbon nanotubes produced by the methods and catalyst compositions of the current invention (hereinafter, SMW-100 refers to multi-wall carbon nanotubes produced by the catalyst composition described for PXE2-282 in FIG. 1) were compared to various commercially available carbon nanotubes having diameter distributions described in Table 1 and FIGS. 4A-D. The following Table 1 provides the carbon nanotube diameter distributions for various commercially available multi-wall carbon nanotubes and SMW-100. For example, with regard to SMW-100 ten percent of the nanotubes have diameters smaller than 4.2 nm, 50% of the total nanotubes have diameters smaller than 6.7 nm and 90% of the total nanotubes have diameters smaller than 12 nm.

TABLE 1

|  | 10% | 50% | 90% |
| --- | --- | --- | --- |
| SMW-100 | 4.2 nm | 6.7 nm | 12.0 nm |
| MWCNT A | 5.5 nm | 7.8 nm | 13.0 nm |
| MWCNT B | 7.4 nm | 12.0 nm | 16.5 nm |
| MWCNT C | 7.1 nm | 9.9 nm | 13.3 nm |

Polycarbonate Makrolon 2600 PC granules were melt mixed with the carbon nanotube sources described in Table 1. Melt mixing was performed in a DSM micro-compounder (15 cm3) under the following conditions: screw speed—200 rpm; temperature—280° C.; time—5 min) Pressed plates (60 mm diameter×0.5 mm thickness) were prepared from extruded strands (temperature: 280° C., time: 1 min, pressure:

100 kN). Carbon nanotube samples were characterized by TGA and TEM analysis (FIGS. 4A-D).

Resistivity was measured with a Keithley 6517A Electrometer in combination with a Keithley 8009 test fixture (for resistivity >$10^7$ Ohm cm) or a strip test fixture (for resistivity <$10^7$ Ohm cm). For the purposes of this disclosure, the term percolation threshold is that concentration of carbon loading at which there is one, and only one, continuous conducting pathway in the material.

Results

Figure 5:
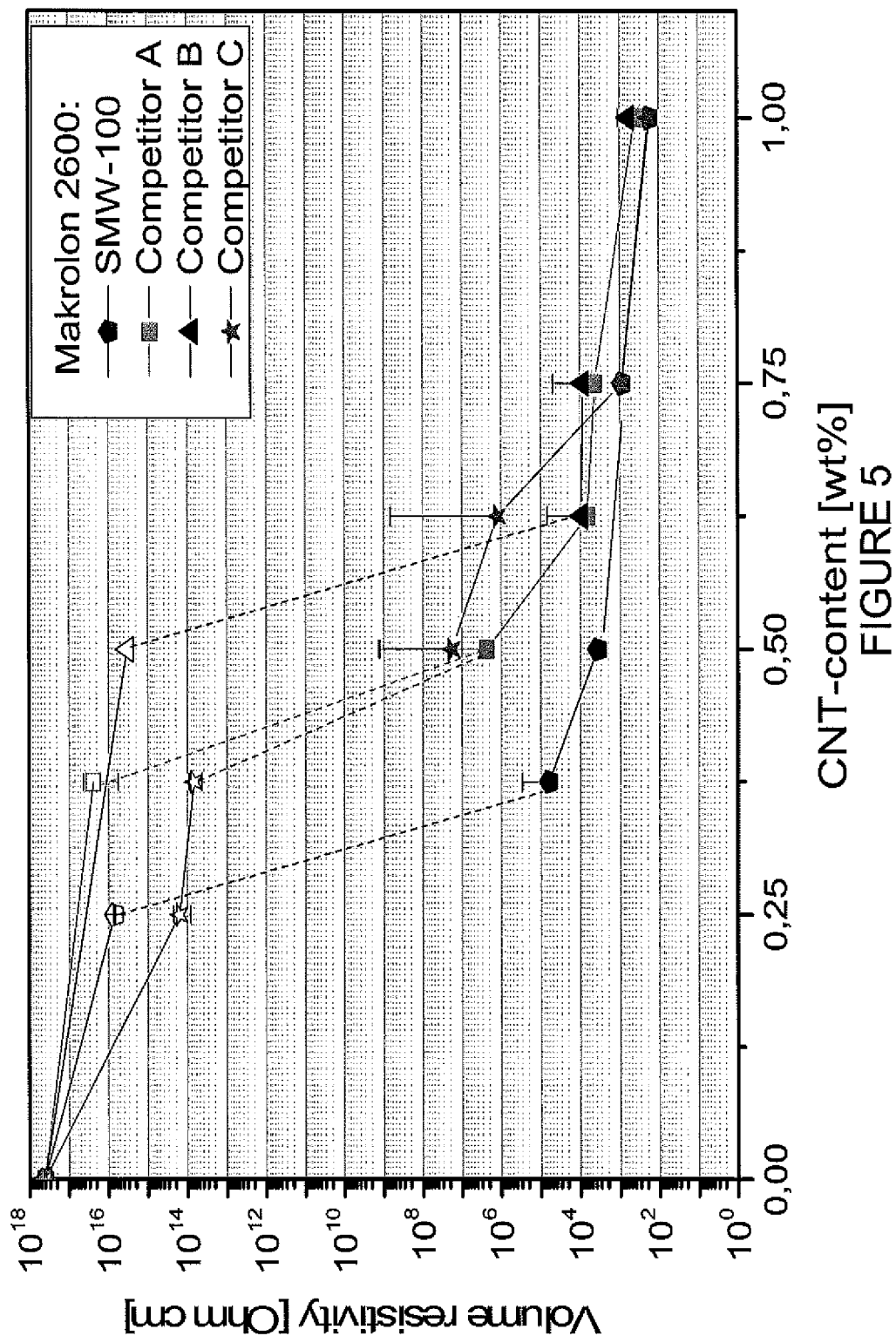
FIG. 5 is a graphical representation of electrical volume resistivity for SMW-100 carbon nanotubes and three commercial carbon nanotube products in polycarbonate.

FIG. 5 demonstrates that the SMW-100 carbon nanotube material provides the lowest electrical percolation threshold. As depicted in FIG. 5, a CNT loading of 0.33 wt. % satisfied the requirement for electrical percolation. As shown by FIG. 5, SMW-100 provided resistivity reading of $10^4$-$10^2$ Ohm/cm for loadings ranging from 0.5-1.0 wt %. In contrast, the comparative carbon nanotubes having diameters between 7-9 nm (MWNT A), 10-11 nm (MWNT C), and 12-15 nm (MWNT B) respectively yielded percolation thresholds of 0.50 wt %, 0.50 wt % and 0.55-0.60 wt %.

Based on the above, results, the use of a batch of straight multi-wall carbon nanotubes having the characteristics of SMW-100 provided by Table 1 and FIG. 1 will provide higher conductivity properties at lower loading levels than other commercially available sources of multi-wall carbon nanotubes.

Example 4

Objective

This study compares the performance of composites based on commercially available multi-wall carbon nanotubes dispersed in Nylon 66 resin to composites prepared from SMW-100 carbon nanotubes dispersed in Nylon66 resin.

Methods

CNT-Nylon 6,6 compounding was performed via twin screw extrusion. The resulting composites were then injection-molded into standard ASTM test bars and plaque (4 in by 4 in by 3.2 mm). Conductivity measurements were then performed on the injection-molded plaques using a standard ProStat resistance meter as per ASTM D-257 for Volume and Surface resistance. Surface resistance was determined using PRF-912B probe at 25 predetermined locations on each surface of the injection molded plaques—i.e. 25 points on the front surface and 25 points on the back surface of the plaques. This rigorous testing is designed to bring out any minor variations in electrical performance due to non-uniformity in material and/or processing. The front surface of the plaques corresponds to where the ejector pins are located. The back surface of the plaques corresponds to the fixed part of the tool (closer to Nozzle). Volume resistances of the plaques were tested using a PRF-911 concentric ring at five locations per sample and averaged for both the front and back of the plaques.

Results

Figure 6A:
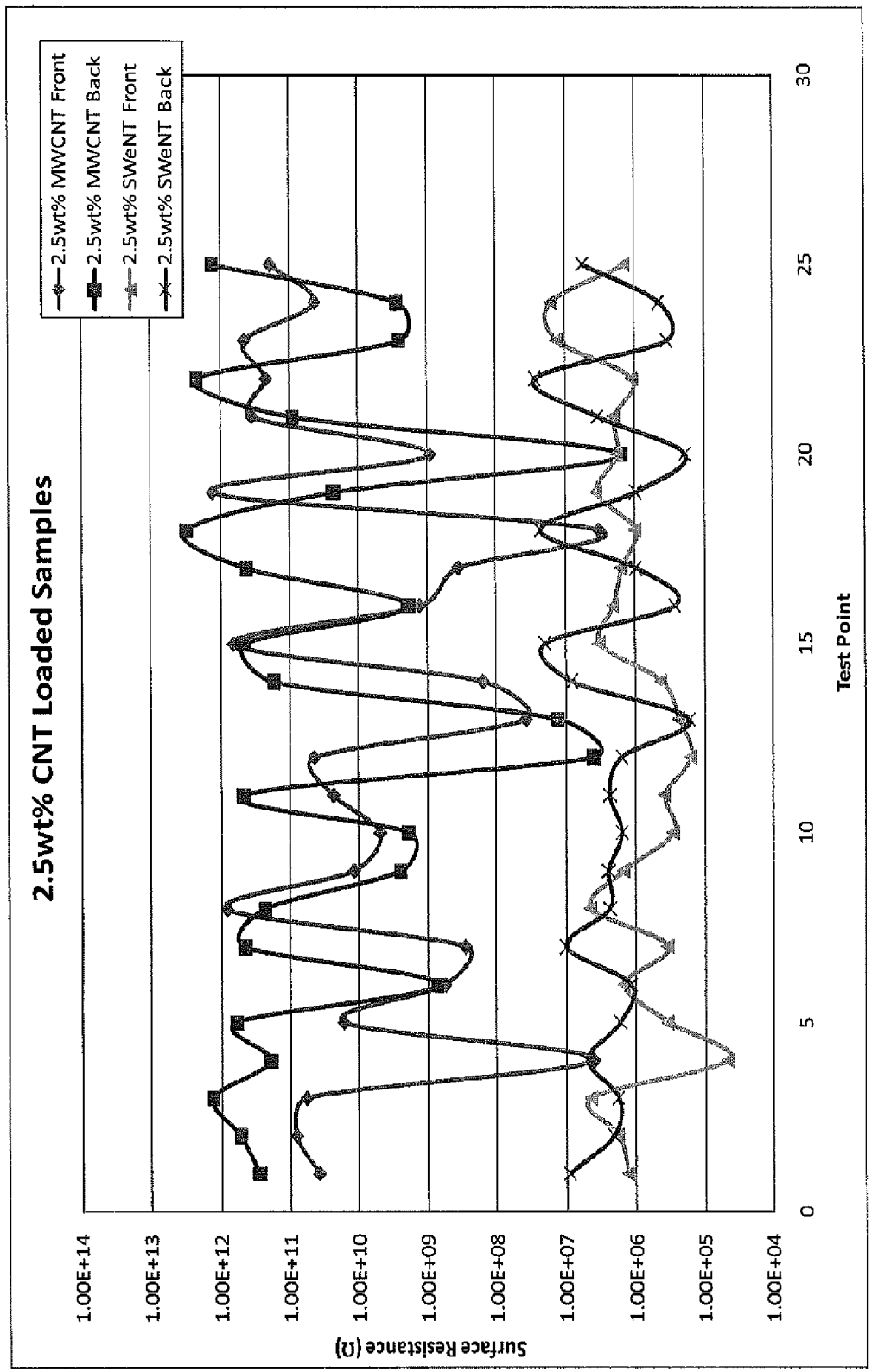
FIG. 6A is a graphical representation of surface resistance on the front and back of composites containing Nylon66 resin loaded with 2.5 wt % SMW-100 carbon nanotubes or loaded with 2.5 wt % of commercially available multi-wall carbon nanotubes.
Figure 6B:
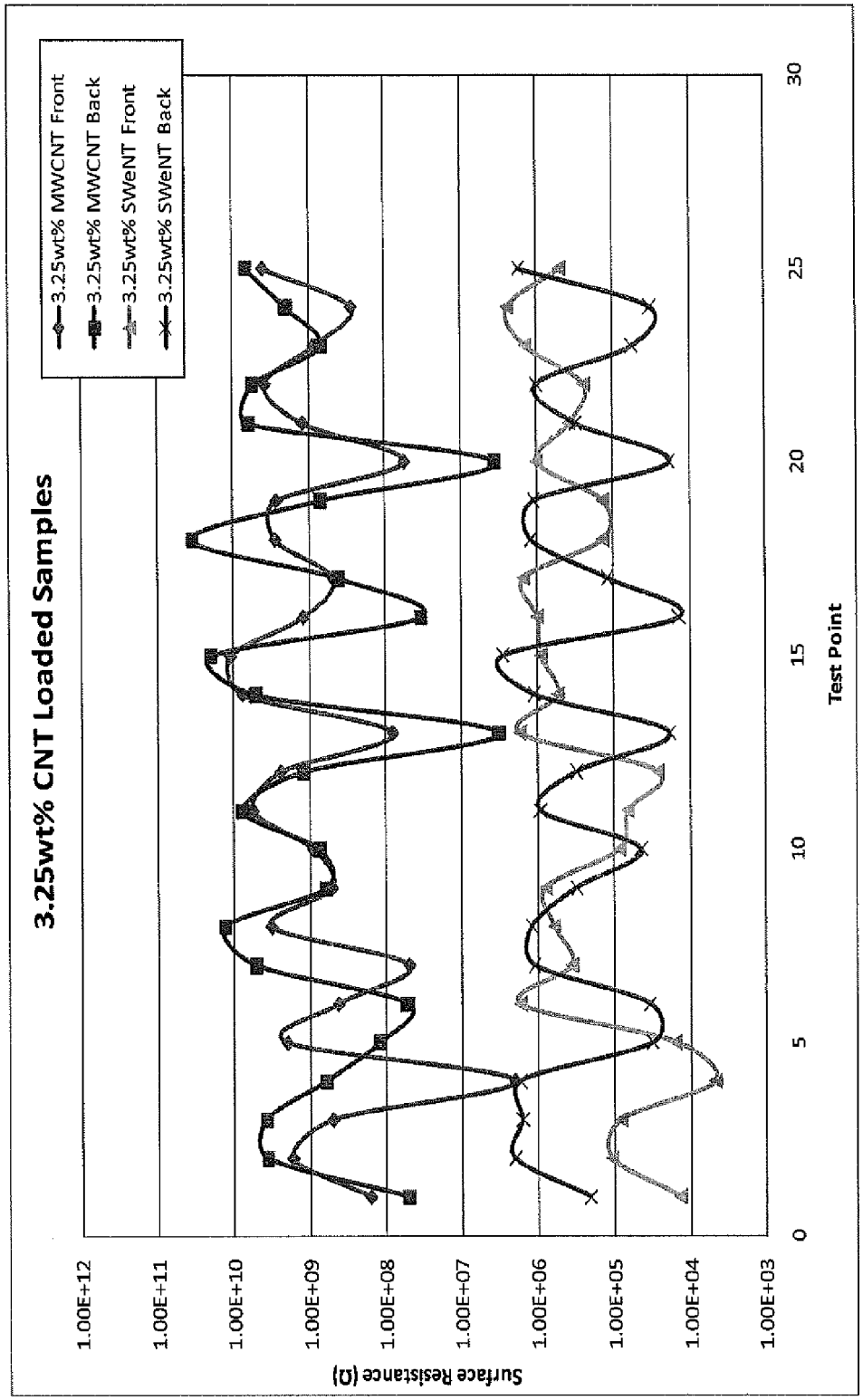
FIG. 6B is a graphical representation of surface resistance on the front and back of composites containing Nylon66 resin loaded with 3.5 wt % SMW-100 carbon nanotubes or loaded with 3.5 wt % of commercially available multi-wall carbon nanotubes.

The surface resistance data is depicted in FIGS. 6A and 6B. SMW-100 composites exhibited lower and more uniform electrical resistance properties after molding compared to the commercially available multi-wall carbon nanotube (MWCNT). The surface resistance, of the MWCNT and SMW-100 filled samples are fairly uniform and consistent with very good agreement on the front and back surfaces of the plaques.

Furthermore, Nylon 6,6 based composite with SMW-100 showed higher conductivity values than Nylon 6,6 based composite with commercially available grades of MWCNT.

The SMW-100 composites also showed more uniform resistance values, with a narrower range of standard deviation between the tested points and between the front and back surfaces of the plaques. As reflected by FIGS. 6A and 6B, composites prepared from the inventive carbon nanotube material, i.e. a batch of nanotubes having a narrow distribution of diameters and number of walls, have improved conductivity when compared to currently available materials.

Example 5

Objective

This example compares the surface resistivity of thin films containing respectively: SMW-100; single-wall carbon nanotubes (SWNT); double-wall carbon nanotubes (DWNT); and, commercially available multi-wall carbon nanotubes (MWCNT B—from Example 3).

Methods

Carbon nanotube-based thin films having different degrees of transparencies (80-95% transmittance) were prepared using solutions containing 1 g carbon nanotube/liter in 1% Triton-X100 surfactant. The solutions were then sonicated and centrifuged. The various carbon nanotube inks were deposited on a PET 505 substrate employing the rod coating technique.

Results

Figure 7:
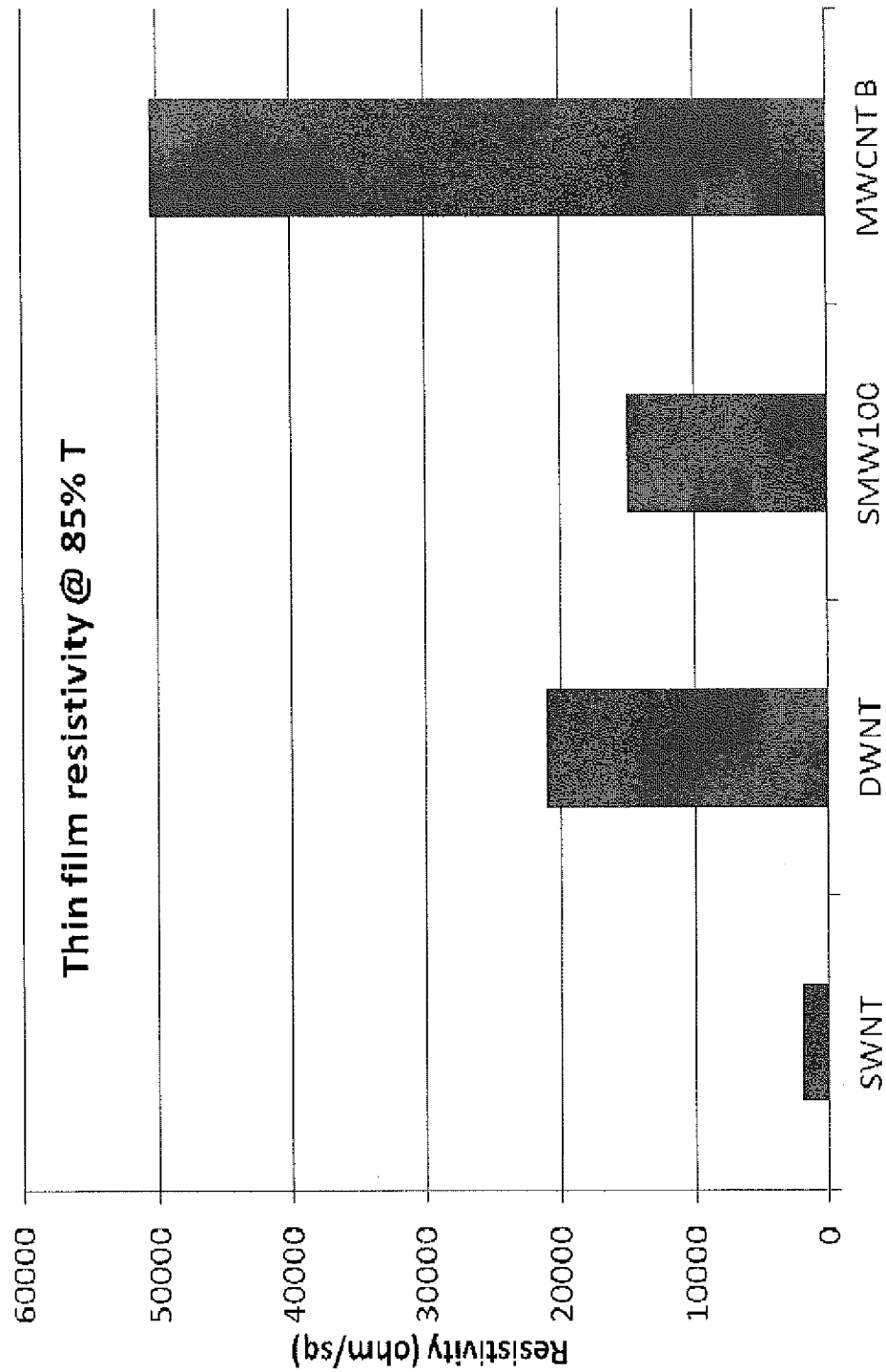
FIG. 7 depicts surface resistivity of thin film comprising different forms of carbon nanotubes.

As depicted in FIG. 7, films having 80-90% transparency prepared with SWNTs demonstrate higher electrical conductivity than the other type of carbon nanotube materials in thin film. However, films prepared using the novel batch material of the current invention, i.e. the SMW-100, had better conductivity performance than films incorporating conventional DWNT and MWNT.

Other embodiments of the current invention will be apparent to those skilled in the art from a consideration of this specification or practice of the invention disclosed herein. Thus, the foregoing specification is considered merely exemplary of the current invention with the true scope and spirit of the invention being defined by the following claims.

We claim:

1. A catalyst precursor composition comprising:
   a support comprising alumina and magnesium aluminate; and
   with magnesium oxide and mixed metal oxides on a surface of the support,
   wherein the mixed metal oxides are selected from the group consisting of $Co_xFe_yMoO_4$, $Fe_2(MoO_4)_3$ and blends thereof and wherein the atomic ratio of magnesium oxide to alumina is between about 0.02 to about 0.04,
   wherein x and y for the mixed metal oxides represented by $Co_xFe_yMoO_4$ is from about 1.6 to 6.5, and 0 to 10.5, respectively.

2. The catalyst precursor composition of claim 1, wherein x is from about 2.44 to 4.88 and y is from about 1.75 to 6.98.

3. The catalyst precursor composition of claim 1, wherein the mixed metal oxide is selected from the group consisting of $Co_{3.3}Fe_{2.62}MoO_4$ and blends thereof.

4. The catalyst precursor composition of claim 1, wherein the mixed metal oxide is selected from the group consisting of $Co_{3.3}Fe_yMoO_4$ and blends thereof, where y may range from 2.6 to 6.3.

5. The catalyst precursor composition of claim 1 wherein the alumina is gamma-alumina.

* * * * *